United States Patent [19]

Yoshida et al.

[11] Patent Number: 5,367,616

[45] Date of Patent: Nov. 22, 1994

[54] ISOPLETH GENERATOR FOR APPLYING ISOPLETHS TO DIGITAL PICTURE DATA AND METHOD THEREFOR

[75] Inventors: Naozane Yoshida, Yokohama; Tsutomu Takagi; Nobuhiro Washiya, both of Fujisawa; Hitoshi Abe, Hadano; Katsutoshi Tajima, Chigasaki, all of Japan

[73] Assignee: Hitachi, Ltd., Tokyo, Japan

[21] Appl. No.: 730,467

[22] Filed: Jul. 16, 1991

[30] Foreign Application Priority Data

Jul. 16, 1990 [JP] Japan .................. 2-187441

[51] Int. Cl.$^5$ .............................. G06F 15/62
[52] U.S. Cl. ...................... 395/142; 395/140; 395/162
[58] Field of Search ............ 395/121, 125–127, 395/140–143, 162

[56] References Cited

U.S. PATENT DOCUMENTS

| | | | |
|---|---|---|---|
| 4,193,122 | 3/1980 | Bowers | 395/141 X |
| 4,674,046 | 6/1987 | Ozeki et al. | 395/127 X |
| 4,841,292 | 6/1989 | Zeno | 395/119 X |
| 4,945,498 | 7/1990 | Mitamura | 395/141 |
| 5,038,285 | 8/1991 | Jouandet | 364/413.16 |

Primary Examiner—Heather R. Herndon
Assistant Examiner—Almis Jankus
Attorney, Agent, or Firm—Antonelli, Terry, Stout & Kraus

[57] ABSTRACT

An apparatus for adding isopleths to image data includes an input device for sequentially inputting image data to be displayed on an image screen of a display device, a horizontal delay circuit for delaying the inputted data by one horizontal scanning period, a column comparator for comparing the inputted data, that is, a sample, with a delayed sample from the horizontal delay circuit to thereby generate a signal indicating a sample to be converted into isopleth data, a sample delay circuit for delaying the sample outputted from the horizontal delay circuit by one sampling period, a row comparator for comparing the sample outputted from the horizontal delay circuit with the sample outputted from the sample delay circuit to thereby generate a signal indicating a sample to be converted into isopleth data, and an isoplete data generator responsive to the output of the column and row comparators for replacing the indicated input sample by predetermined distinguishable data and for outputting the predetermined distinguishable data to the display device.

7 Claims, 8 Drawing Sheets

ISOPLETH GENERATOR FOR APPLYING ISOPLETHS TO DIGITAL PICTURE DATA AND METHOD THEREFOR

BACKGROUND OF THE INVENTION

The present invention relates to an isopleth generator for applying isopleths or contour lines to digital image data, and a method therefor.

When observed data of temperature distribution, pressure distribution, etc., or two-dimensional distribution data such as a simulation result of those observed data by means of a computer is displayed on a display, generally, such data is expressed by variable density of picture elements, change of hue, etc.

In consideration of making observation easy, accurate, and so on, it is more convenient to add isopleths or contour lines obtained by successively connecting values of the same level.

As an example of a conventional isopleth generator, JP-A-1-187678 discloses an isopleth generator in which isopleths made up from measured data by successively connecting data of the same level can be drawn smoothly.

In this example, isopleths are displayed in the following manner.

The isopleth generator is provided which a first memory holding original image data of one frame or more, and second and third memories each having a memory capacity for storing image data of one frame, so that data read from the first memory is binary-coded on the basis of a predetermined threshold value and the binary-coded data is stored in the second memory.

Further, the data in this second memory is processed so as to be expanded or contracted by one picture element, and the thus processed data is stored in the third memory.

A difference between the data in the second memory and the data in the third memory, so that only the portions corresponding to isopleths becomes data having values other than zero, while other portions become data having the value zero. Thus, isopleths or contour lines can be obtained and displayed.

In the above-mentioned conventional example, in order to make up isopleths, memories each having a capacity of (1 bit)×(1 frame) are required by two in number as the above-mentioned second and third memories.

In addition, since it takes much time for these memories to execute read/write operation (overhead) of data, the conventional isopleth generator has not been suitable for dealing with animation or the like in which the image data changes every frame.

SUMMARY OF THE INVENTION

It is therefore an object of the present invention to provide an isopleth generator and a method therefor, by which isopleths can be obtained with less memory capacity.

It is another object of the present invention to provide an isopleth generator having less overhead for the input image data.

In order to attain the foregoing objects, according to an aspect of the present invention, an isopleth generator for obtaining isopleths upon addressable data by pairs (I, J) of two numerical values on a matrix corresponding to an image area comprises: input means for inputting the above-mentioned data; a row comparator for comparing adjacent ones, in the row direction, of input data adjacent to each other in the row direction with each other and for outputting information as to whether the data is to be displaced by isopleth data or not; and a column comparator for comparing input data adjacent to each other in the column direction with each other and for outputting information as to whether the data is to be displaced by isopleth data.

The isopleth generator further comprises an isopleth data generator by which on the basis of output signals of the two comparators, data of the address assigned by the output signals is converted to generate predetermined isopleth data, for example, by which isopleths can be distinguished from surroundings.

The row comparator acts to compare image data adjacent to each other in the row direction with each other, for example, the data of the address (I, J) with the data of the address (I, J+1) on a frame, and the column comparator acts to compare image data adjacent to each other in the column direction with each other, for example, the data of the address (I, J) on a frame with the data of the address (I+1, J) on a frame.

As to a method of the comparison, for example, in the case of dividing data into several stages, threshold values are established correspondingly to the number of the stages.

Next, for example, if one data to be compared is equal to a threshold value and the other data is smaller than the threshold value, an instruction to replace the data equal to the threshold value with isopleth data is given to the isopleth data generator.

The isopleth data generator performs data conversion by a predetermined conversion method, for example, a conversion table upon data of the address assigned by above-mentioned comparators, and outputs the data after the conversion.

As a result, since a frame memory to obtain isopleths is unnecessary, it is possible to obtain isopleths with less memory capacity.

In the isopleth generator, as a memory, required are only a memory for storing bits of image data for one horizontal scanning period, a register corresponding to bits of the image data, a register for storing one bit for one horizontal scanning period, and two one-bit registers, so that overhead required for a read/write operation of data is reduced on a large scale, and the isopleth generating speed is made high enough to apply the isopleth generator to animation.

BRIEF DESCRIPTION OF THE DRAWINGS

Other features and advantages of the present invention will be apparent from the following description taken in connection with the accompanying drawings, wherein.

DESCRIPTION OF THE PREFERRED EMBODIMENTS

A first embodiment of the present invention will be described with reference to FIG. 1.

Figure 1:
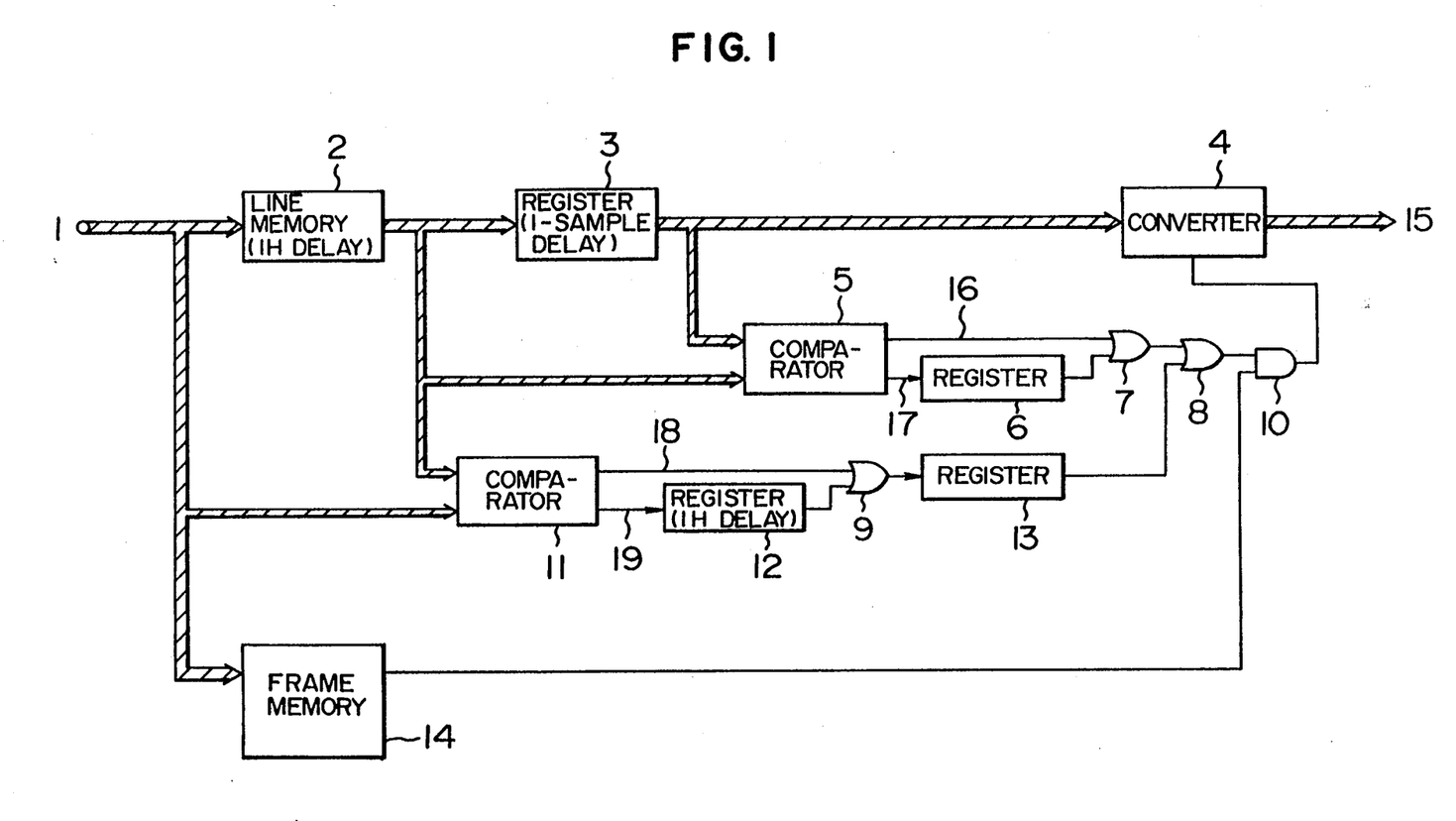
FIG. 1 is a block diagram illustrating an embodiment of the isopleth generator according to the present invention.

FIG. 1 is a block diagram illustrating the isopleth generator according to the present invention.

In FIG. 1, a reference numeral 1 represents an input terminal as an input means for inputting image data. A reference numeral 2 represents a line memory as a horizontal delay means for delaying, by one horizontal scanning period, the data inputted for data comparison in the column direction of image data. The line memory 2 has a function to delay, for example, 8 bits of digital image data by one horizontal scanning period (1H) before outputting the 8 bits as output data.

A reference numeral 3 represents a register, for example, of 8 bits, constituting a sample delay means for storing image data for one sampling period and for outputting the stored image data sequentially, thereby delaying the image data by one sampling period in order to compare the data adjacent to each other in the row direction.

A reference numeral 5 represents a comparator as means for comparing adjacent data in the row direction, and 11 represents a comparator as means for comparing adjacent data in the column direction. Each comparator performs size comparison upon values of upper n-bits between adjacent samples of image data, and outputs a signal expressing which sample is to be converted into isopleth data (hereinafter referred to as "conversion request signal"), when data to be converted into isopleth data is detected.

Depending on the selection as to which one of the delayed and not-delayed samples is to be converted, the conversion request signal is supplied to corresponding one of the two output lines. In the case of a not-delayed sample, the conversion request signal is delayed in a register 6 so as to be synchronized with a sample from the register 3.

A reference numeral 12 represents a register for delaying a conversion request signal so that if input data, that is, a sample from the line memory 2 is larger as a result of comparison in the adjacent column comparator 11, the conversion request signal is supplied into a converter 4 synchronously as this input data is supplied into the converter 4, that is, a register for delaying a 1-bit signal supplied from the comparator 11 by one horizontal scanning period.

Reference numerals 6 and 13 represent respective registers for delaying a 1-bit signal by one sampling period, in order to delay a conversion request signal supplied when the input sample of the register 3 is larger or a conversion request signal from the comparator 11 by one sampling period in accordance with the delay of the sample by one sampling period in the register 3.

Reference numerals 7 to 9 represent OR gates for executing ORing between conversion request signals, and 10 represents an AND gate for executing ANDing between a conversion request signal and mask data.

A reference numeral 4 represents a converter for converting image data into isopleth data when the output of the AND gate becomes true.

In addition, a reference numeral 14 represents a (1 bit)×(1 frame) frame memory for storing mask data expressing an area not to be converted into isopleth data, if such an area is desired to be established. The frame memory 14 is not relevant directly to the gist of the present invention and it is therefore optional.

Next, the operation of the above-mentioned isopleth generator will be described.

The input image data is delayed sample by sample by one horizontal scanning period by means of the line memory 2 in order to compare the image data in the column direction.

The image data is delayed by one sampling period by means of the register 3, and then supplied to into the converter 4.

If the output of the AND gate, which is a conversion request signal, is not true (or high), the image data is supplied to an output terminal 15 of this isopleth generator, and if the output of the AND gate 10 is true, the image data is converted into isopleth data and then supplied to the output terminal 15.

The operation in the case where image data is converted into isopleth data will be described below in detail.

Whether image data is to be converted into isopleth data or not is decided on the basis of the upper n-bits of respective adjacent samples of image data compared in the comparators 5 and 11.

For example, assuming that each sample is constituted by 8 bits and the number n of the upper bits to be compared is 1, then the threshold to convert data into isopleth data is set to 128 or 127 upon data from 0 to 255.

The first embodiment employs, for example, the larger value "128" as a judgment threshold for isopleth data.

Then, each of the comparators 5 and 11 outputs a conversion request signal when image data connected with one input of the comparator is not larger than 127 and image data connected with the other input is not smaller than 128.

In the case where the number n is 2, each comparator checks as to whether three kinds of conditions, that is, not larger than 63 and not smaller than 64, not larger than 127 and not less than 128, and not more than 191 and not less than 192, are satisfied by the values of image data connected with the respective two inputs of the comparator.

In the operation of the comparator 11, two image data made to have a time difference of one horizontal scanning period by the line memory 2 are compared.

If the two data, that is, samples satisfy the above-mentioned condition, a conversion request signal is supplied to a signal line 18 or 19.

If the output data from the line memory 2 is larger, the conversion request signal is supplied to the signal line 18.

In the opposite case, the conversion request signal is supplied to the signal line 19.

In the operation of the comparator 5, a sample of image data made to have a delay time difference of one sampling period by the register 3 is compared with a sample of image data from the line memory 2.

In the same manner as in the comparator 11, if the two samples satisfy the above-mentioned condition, a conversion request signal is supplied to a signal line 6 or 17.

If the output of the register 3 is larger than the output of the line memory 2, the conversion request signal is supplied to the signal line 16.

Next, the operation at the time of inquiring adjacent samples in the column direction and obtaining isopleths will be described.

If it is judged out from the comparison of upper n-bits in the comparator 11 that the output of the line memory 2 is larger than the direct input from the input terminal 1, the comparator 11 makes its output to the signal line 18 true.

In this case, the image data supplied from the line memory 2 and the output of the signal line 18 are delayed by one sampling period by means of the registers 3 and 13 respectively, and then supplied to the converter 4 synchronously.

In the converter 4, this image data is converted into isopleth data.

On the contrary, if it is judged out from the comparison of upper n-bits in the comparator 11 that the input to the line memory 2 is larger than the output therefrom, the comparator 11 makes its output to the signal line 19 true.

In this case, the image data supplied into the line memory 2 and the output of the signal line 19 are delayed by one horizontal scanning period by means of the line memory 2 and the register 12, and by one sampling period by means of the registers 3 and 13 respectively, and then supplied to the converter 4. The signals are therefore supplied into the converter synchronously with each other.

In the converter 4, this image data is converted into isopleth data.

In the above-mentioned manner, data in the column direction, that is, in the longitudinal direction on an image area, are checked to determine the data to be converted into isopleth data.

Next, the operation at the time of inquiring adjacent samples in the row direction and obtaining isopleths will be described.

If it is judged out from the comparison of upper n-bits in the comparator 5 that a delayed sample supplied from the register 3 is larger than a sample supplied thereto, the comparator 5 makes its output onto the signal line 16 true. In this case, the sample of image data supplied from the register 3 and an output signal of the signal line 16, that is, a conversion request signal, are supplied into the converter 4.

In the converter 4, the portion of this image data corresponding to the conversion request signal is converted into isopleth data.

If it is judged out from the comparison of upper n-bits in the comparator 5 that the input to register 3 is larger than the output therefrom, on the contrary, the comparator 5 makes its output onto the signal line 17 true.

In this case, the image data supplied to the register 3 and an output signal of the signal line 17 are delayed by one sampling period by means of the registers 3 and 6 respectively, and then supplied to the converter 4.

In the converter 4, the portion of this image data corresponding to the delayed conversion request signal is converted into isopleth data.

In the above-mentioned manner, data in the row direction, that is, in the transversal direction on an image area, are checked to thereby determine the data to be converted into isopleth data.

Since the above-mentioned operation is performed sequentially upon all the picture elements herein having one to one correspondence to samples, when a certain picture element is considered on an image area and if the value of upper n-bits of the picture element in consideration is larger than that of any other picture element of its upper, lower, left or right adjacent one, the picture element in consideration is replaced with isopleth data.

In the whole of the two-dimensional image area, isopleths are drawn.

Hereafter, how to add isopleths actually will be described along an example of image data shown in FIGS. 2A to 2F.

Figures 2A, 2B:
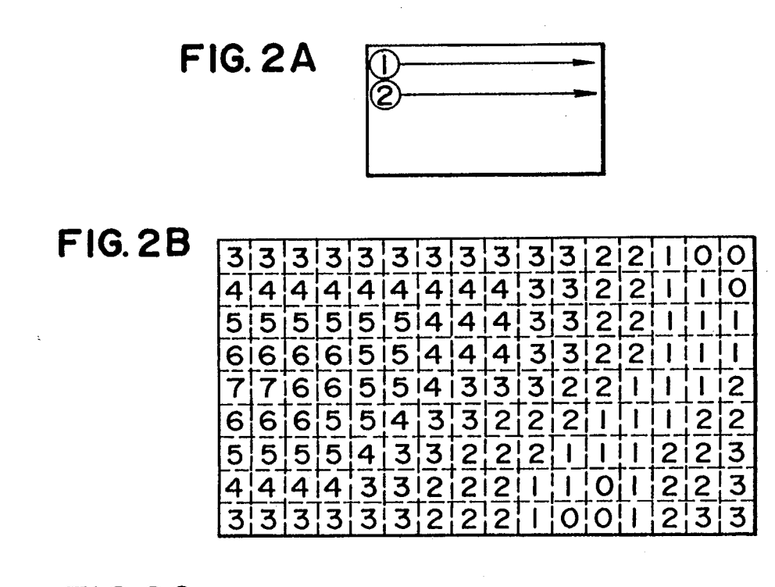
FIGS. 2A through 2F are explanatory diagrams illustrating a state of adding isopleths by the isopleth generator according to the present invention.

FIG. 2A shows the corresponding relationship between the order of samples of image data to be supplied to the isopleth generator shown in FIG. 1 and the arrangement on a real image area.

That is, an image data is supplied to the input terminal 1 line-sequentially from the upper line and from the left thereof one picture element by one picture element, that is, sample by sample.

FIG. 2B shows an example of the image data.

For the sake of simplification, assume that the image area has 9 dots in its longitudinal direction and 16 dots in its transversal direction, and image data has 3 bits. And assume that the number n of comparison bits is 2.

Figure 2C:
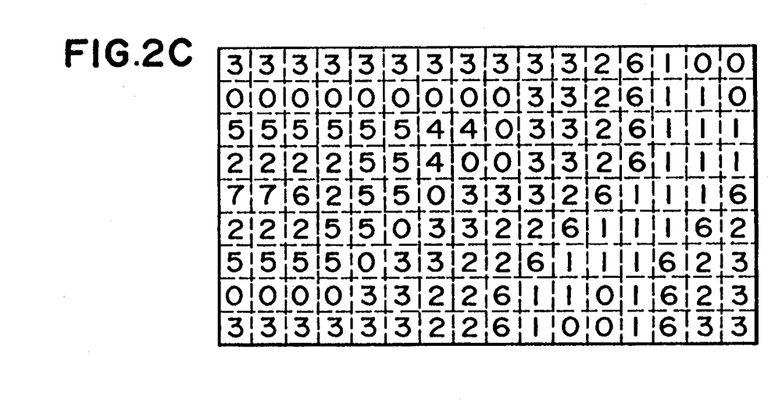
Figure 2D:
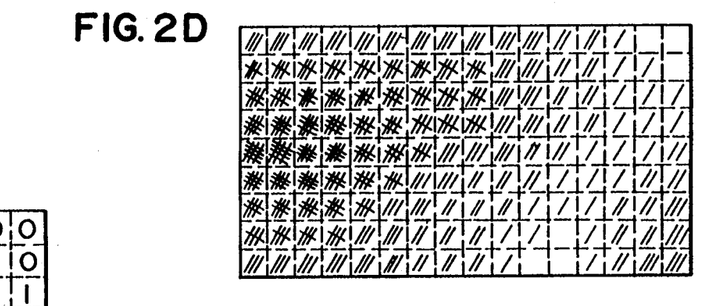

FIG. 2D expresses the image data of FIG. 2B by the number of hatches per picture element, showing the image of variable density as a reference.

FIG. 2C shows image data to which isopleth data is added by this isopleth generator.

The manner of making up these drawings will be described.

Since the comparison bits of the comparators 5 and 11 in FIG. 1 are made to be upper two bits, threshold values are 2, 4 and 6. As shown in FIG. 2B, therefore, picture elements taking the value not smaller than 2 and having a picture element taking the value not larger than 1 in its upper, lower, left or right, picture elements taking the value not smaller than 4 and having a picture element taking the value not larger than 3 in the same manner, and picture elements taking the value not smaller than 6 and having a picture element taking the value not larger than 5 in the same manner are converted into isopleth data in FIG. 2C.

Figure 2E:
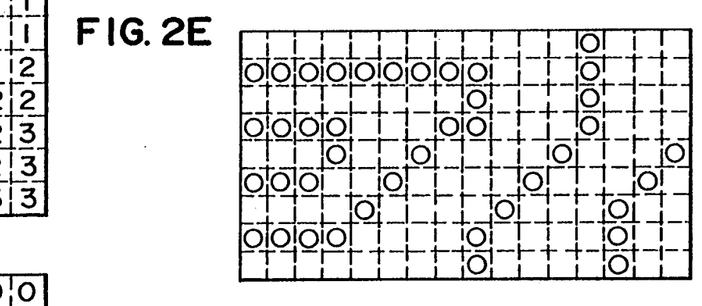

In FIG. 2E, of the picture elements of FIG. 2B, the picture elements to be converted into isopleth data are designated by the circle marks.

The conversion of image data into isopleth data in the converter 4 may be performed by inverting the most significant bit (MSB).

That is, 2, 4 and 6 are converted into 6, 0 and 2 respectively.

Consequently, isopleths having a suitable luminance difference from their surroundings are drawn on a display image area.

Figure 2F:
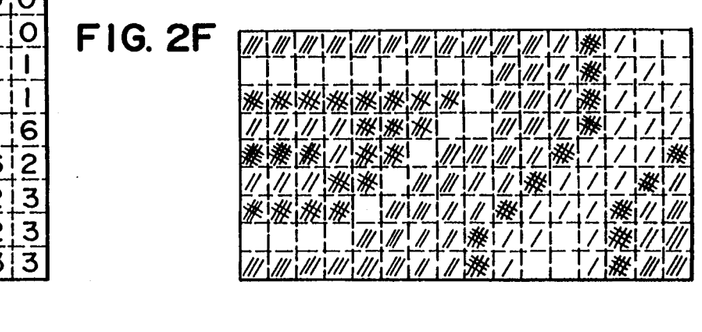

FIG. 2F expresses the image data in FIG. 2C having isopleths drawn therein by the number of hatches per picture element, showing there is a suitable luminance difference.

In the above manner, isopleths are drawn actually on a display image area.

According to the present invention, as has been described, as memories, there are provided a memory for storing bits per sample of image data for one horizontal scanning period, a register corresponding to bits of a sample of the image data, a register for storing one bit for one horizontal scanning period, and two one-bit registers, so that an isopleth generator can be constituted by less memory capacity.

In addition, according to the present invention, isopleths can be added at a transfer rate the same as the transfer rate of image data and the display scanning rate, so that isopleths can be also added to animation.

The operation in the optional case of providing the above-mentioned frame memory will be described.

Mask data is supplied from the input terminal 1 so as to be stored in a mask frame memory 14.

The mask data is a data indicating an area to which isopleths should not be added, such as frames of an image area, drawing data, etc. Mask data having the same address as image data passing the converter 4 is read from the mask frame memory 14 synchronously.

In the area to which isopleths should not be added, the output of the mask frame memory 14 stops a conversion request signal of the output of the OR gate 8 in the AND gate 10.

In the above manner, isopleths are not drawn in a selected area of an image to be displayed, that is, a mask area.

After the mask data is inputted, an image data to be displayed is inputted from the input terminal 1.

Figure 3:
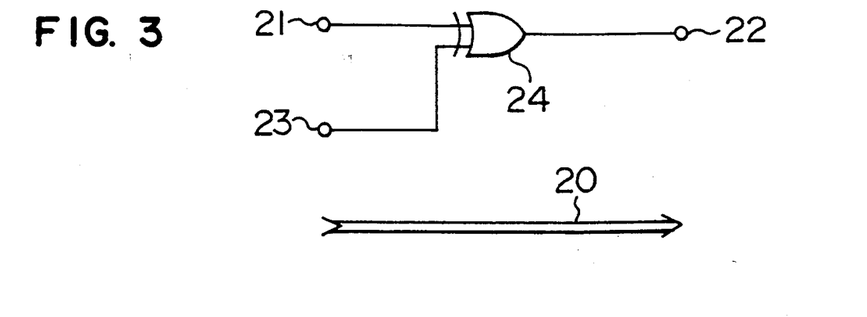
FIGS. 3 to 5 are circuit diagrams illustrating respective examples of a converter to be used in the isopleth generator according to the present invention.

FIG. 3 shows an example of the configuration of the converter 4 in the first embodiment.

A reference numeral 21 represents an input terminal to which the most significant bit of a sample of image data is supplied. A reference numeral 20 represents a signal bus along which data other than the most significant bit of image data passes, an input being outputted as it is through this signal bus. A reference numeral 23 represents an input terminal for a conversion request signal, the AND gate 10 being connected to this input terminal 23 in FIG. 1. A reference numeral 24 represents an exclusive OR gate, and 22 represents an output terminal, the most significant bit of image data being outputted through this output terminal.

Next, the operation of the converter of FIG. 3 will be described.

If a true (logically high level) signal is supplied to the input terminal 23 for a conversion request signal, a signal from the input terminal 21 is inverted, and outputted from the output terminal 22.

If a false (logically low level) signal is supplied to the input terminal 23, a signal from the input terminal 21 is supplied to the output terminal 22 as it is.

A signal other than the most significant bit of image data is always outputted as it is through the signal bus 20.

As has been described, the converter ill FIG. 3 is arranged to invert the most significant bit of image data if there is a conversion request signal, and generate it as isopleth data.

Figure 4:
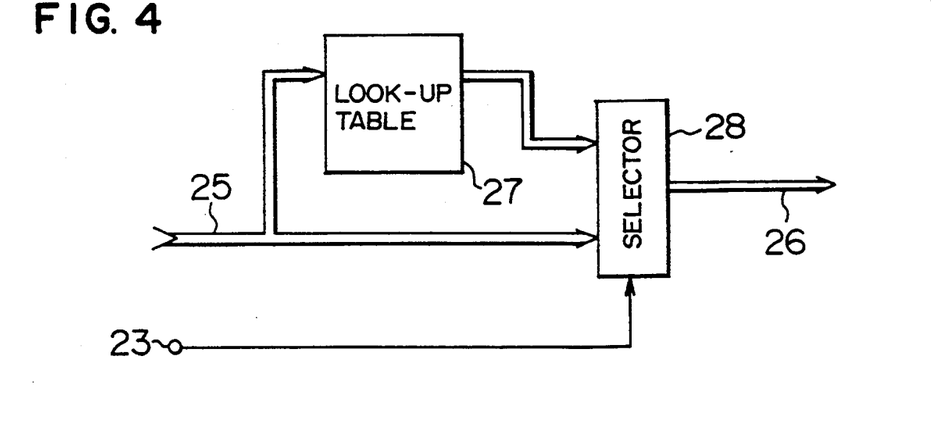

FIG. 4 shows another example of the configuration.

A reference numeral 25 represents an input terminal for image data, 26 represents an output terminal for image data, 27 represents a look-up table constituted by a read only memory and so on, and 28 represents a selector.

Next, the operation of the converter in FIG. 4 will be described.

Correspondingly to image data which has been inputted, the look-up table 27 selects isopleth data established therein from, for example, a color palette every input data, always outputting it.

If a conversion request signal is supplied from the input terminal 23, the selector 28 changes its output to the output of the look-up table 27. If a conversion request signal does not exist, the selector 28 outputs an input signal from the input terminal 25 as it is to the output terminal 26.

According to the example in FIG. 4, in comparison with the example in FIG. 3, since variable data can be established to any, it is possible to draw isopleths which are easy to see or unattractive on purpose.

Figure 5:
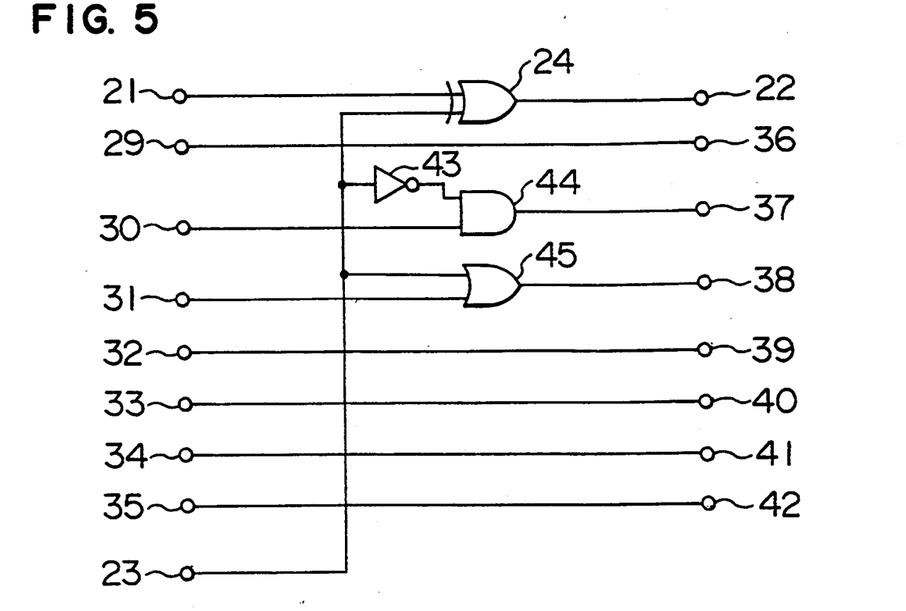

FIG. 5 shows a still further example of the configuration of the converter 4.

The converter in FIG. 5 has a simple configuration, and is particularly suitable for processing digital image data for high definition television (HDTV).

The configuration of FIG. 5 will be described.

The reference numerals 21, and 29 to 35 represent input terminals in the case where each sample of image data has 8 bits. The most significant bit is supplied to the input terminal 21, the next significant bit is supplied to the input terminal 29, succeeding respective bits of image data are supplied to the succeeding input terminals 30 to 34 sequentially, and the least significant bit is supplied to the input terminal 35.

The reference numerals 22, and 36 to 42 represent output terminals. The most significant bit is outputted from the output terminal 22, the next significant bit is outputted from the output terminal 36, succeeding respective bits of image data are outputted from the succeeding output terminals 37 to 41, and the least significant bit is outputted from the output terminal 42.

The reference numeral 23 represents an input terminal for a conversion request signal, the input terminal 23 being connected to the output of the AND gate 10 of FIG. 1. The reference numeral 24 represents an exclusive OR gate.

The reference numeral 43 represents an invertor, 44 represents an AND gate, and 45 represents an OR gate.

According to the standard of digital image data in the high definition television (HDTV), for example, in the case of a luminance signal, the value corresponding to black is 16, and the value corresponding to white is 235.

Therefore, if the most significant bit is inverted simply, there is a case where the inverted value is out of the above-mentioned region from 16 (black) to 235 (white).

For example, if the most significant bit of 112 ("01110000" in the binary system) is inverted, the inverted value becomes 240 ("11110000" in the binary system) beyond the standard 235.

Therefore, when image data is converted into isopleth data, not only the most significant bit is inverted, but also the third bit from the most significant bit is made "0", and the fourth bit is made "1".

As a result, the maximum of isopleth data is 223 in the decimal system ("11011111" in the binary system), and the minimum is 16 in the decimal system ("0010000" in the binary system"), so that there is no case isopleth data is out of the standard.

In this case, however, image data does not have one to one correspondence to the value of isopleth data. For example, 176 in the decimal system ("10110000" in the binary system), 160 in the decimal system ("10100000"

in the binary system) and 144 in the decimal system ("10010000" in the binary system) are converted into the same 16 in the decimal system.

However, as isopleth data, since it will go well only if it has luminance difference from its surroundings, there is not any special problem.

In FIG. 5, if a conversion request signal ("1"; high level) is supplied from the input terminal 23, the most significant bit of image data is inverted by the exclusive OR gate 24, the third bit is made "0" by the AND gate 44, and the fourth bit is made "1" by the OR gate 45.

If there is not a conversion request signal ("0"; low level), input image data is outputted as it is.

As has been described, the circuit in FIG. 5 is a converter for converting image data to isopleth data suitably for the digital standard of high definition TV.

Figure 6:
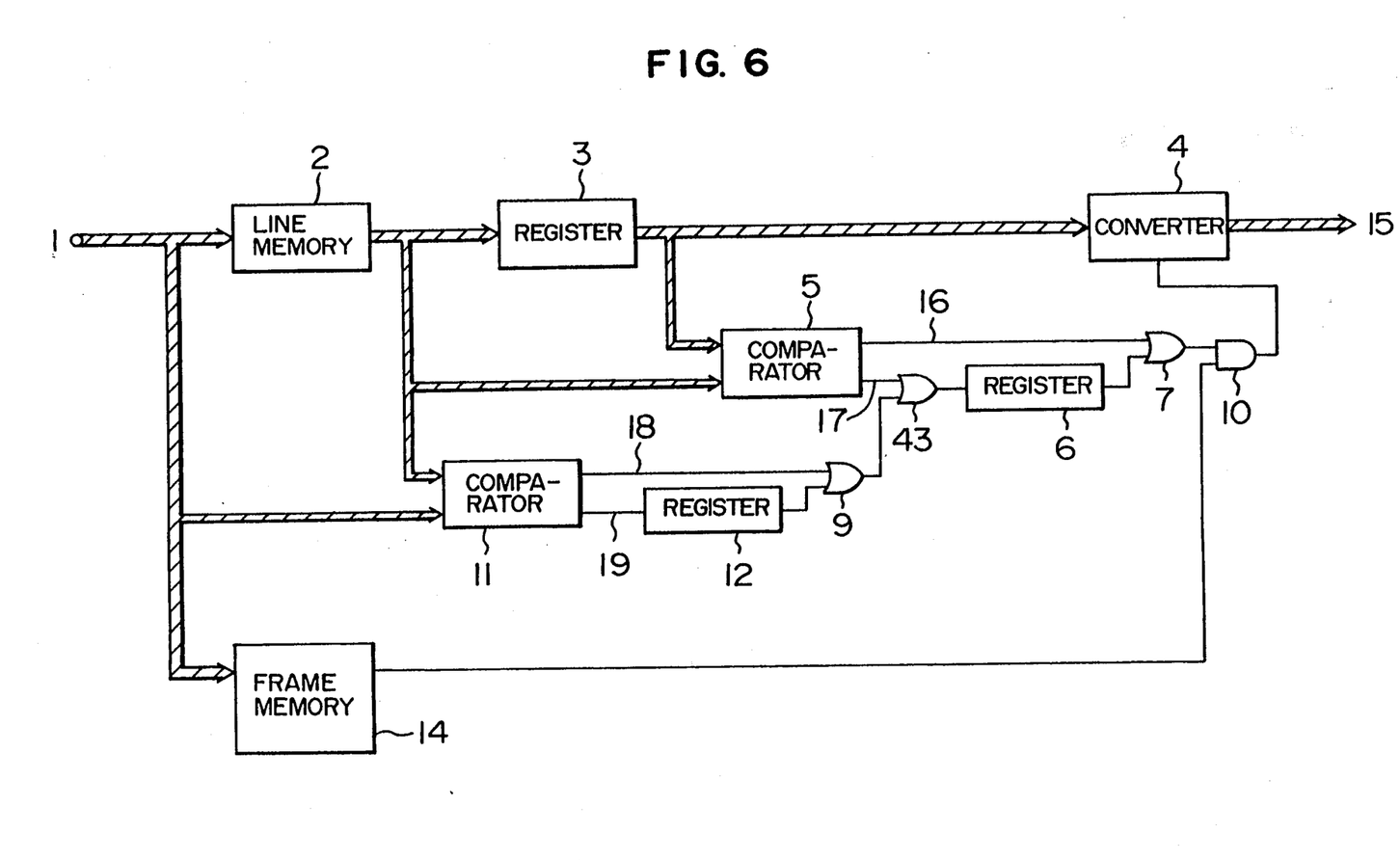
FIG. 6 is a block diagram illustrating another embodiment of the isopleth generator according to the present invention.

FIG. 6 shows a second embodiment of the present invention.

Although the registers 6 and 13 for delaying a one-bit signal by one sampling period are used in the first embodiment, a signal register 6 is commonly used in this second embodiment in place of the registers 6 and 13 of the first embodiment. The OR gate 8 in FIG. 1 is therefore replaced by an OR gate 43 provided in another place for performing ORing between the output of an OR circuit 9 and a signal line 17 so as to supply the result of ORing to the register 6.

The configuration of the other parts is the same as that of the first embodiment.

Figure 7:
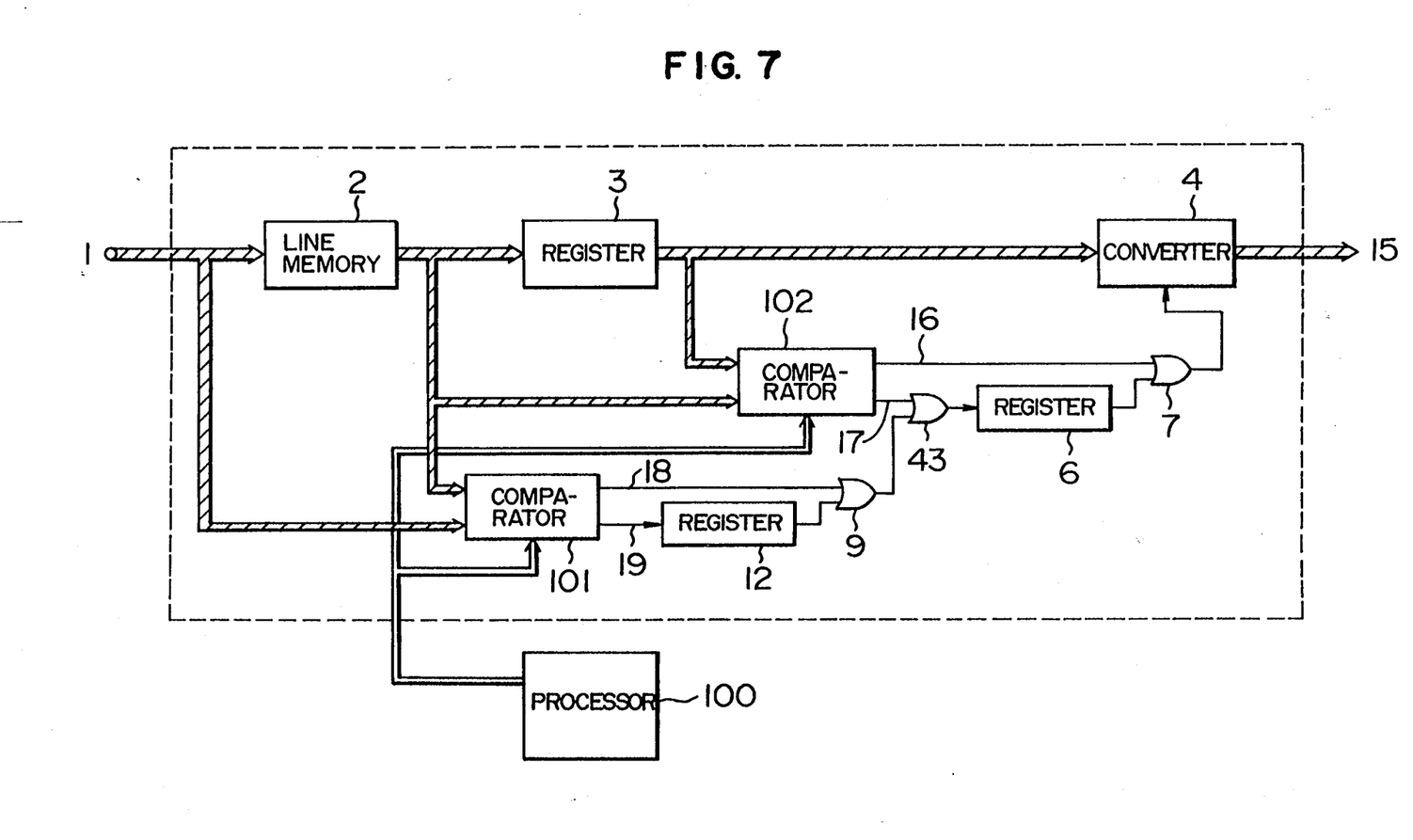
FIG. 7 is a block diagram illustrating a modification of the embodiment of FIG. 6.

FIG. 7 shows an example of modifying the embodiment in FIG. 6, having a function to generate isopleths having desired values. Parts the same as and having the same as those in FIG. 6 are referenced correspondingly. The portion of modifying the embodiment in FIG. 6 is that there is not a mask data circuit (the frame memory 14 and the AND gate 10 in FIG. 6) which is not essential in the present invention, and that comparators 101 and 102 are arranged to draw isopleths with desired values. In addition, provided is a processor 100 such as a CPU, for establishing desired values for the comparators 101 and 102 to draw isopleths.

Figure 8:
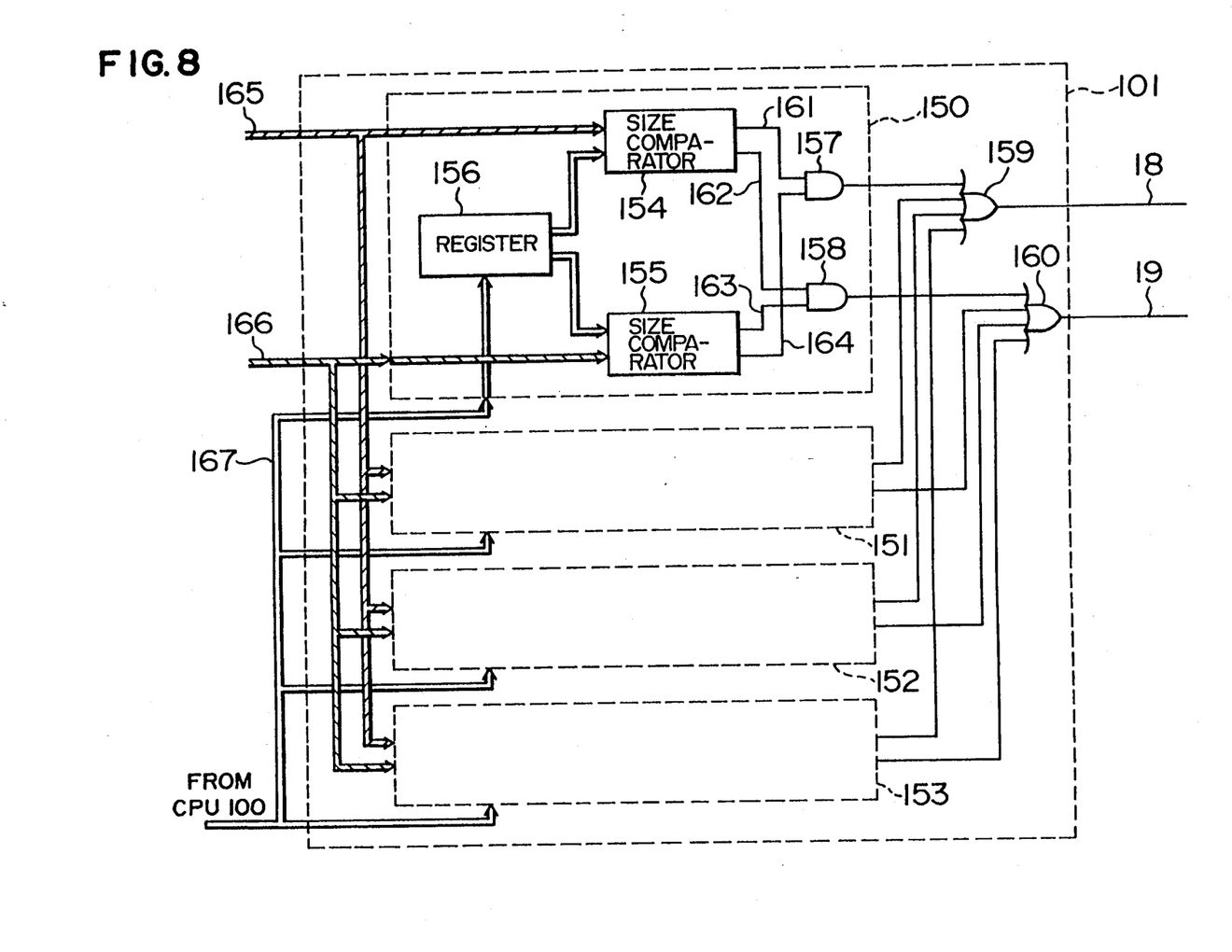
FIG. 8 is a block diagram illustrating an example of the circuit configuration of the comparator in FIG. 7.

Next, the comparators 101 and 102 will be described in detail with reference to FIG. 8. FIG. 8 is a block diagram of the comparator 101. The comparator 102 has the same configuration and function as the comparator 101. The broken-line blocks 150 to 153 are judgment function blocks for judging whether input image data is to be converted into isopleth data or not on the basis of desired set values, respectively. The circuit blocks 154 and 155 are value-size comparators for comparing value sizes of two input digital data, that is, for comparing the respective sizes of the image data and the data set in a register 156. In the register 156, a value to draw isopleths in response to an instruction from the CPU 100 in FIG. 7, that is, a threshold value is set or stored. The reference numerals 157 and 158 represent AND gates, and 159 and 160 represent OR gates. Reference numerals 161, 162, 163 and 164 represent signal lines, 165 and 166 represent buses for image data, and 167 represents a bus for the CPU 100 for setting threshold values to draw isopleths.

The value-size comparators 154 and 155 make the values of the signal lines 161 and 163 true if image data from the buses 165 and 166 are larger than the value set in the register 156, and the value-size comparators 154 and 155 make the values of the signal lines 162 and 164 logically true if the image data are smaller than the value set in the register 156. The output of the AND gate 157 is therefore made true when image data from the bus 165 is larger than the value of the register 156 and image data from the bus 166 is smaller than the value of the register 156. That means the case where the threshold value to draw an isopleth is overpassed between image data from the buses 165 and 166, and in this case, the image data is replaced by isopleth data. Either of data from the buses 165 and 166 is to be converted or how to convert the data into isopleth data is the same as that described in the other embodiment. On the other hand, the output of the AND gate 158 becomes logically true when image data from the bus 165 is smaller than the value of the register 156 and image data from the bus 166 is larger than the value of the register 156. In this modification, since the comparator 101 has four same judgment blocks 150 to 153, that is, the three judgment blocks 151 to 153 are the same in configuration as the judgment block 150 for judging whether an isopleth is to be drawn or not, it is possible to draw isopleths with respect to four desired thereshold values.

Theoretically, the embodiments of FIGS. 1 and 6 are the same, and have the same operation and effect.

Figure 9:
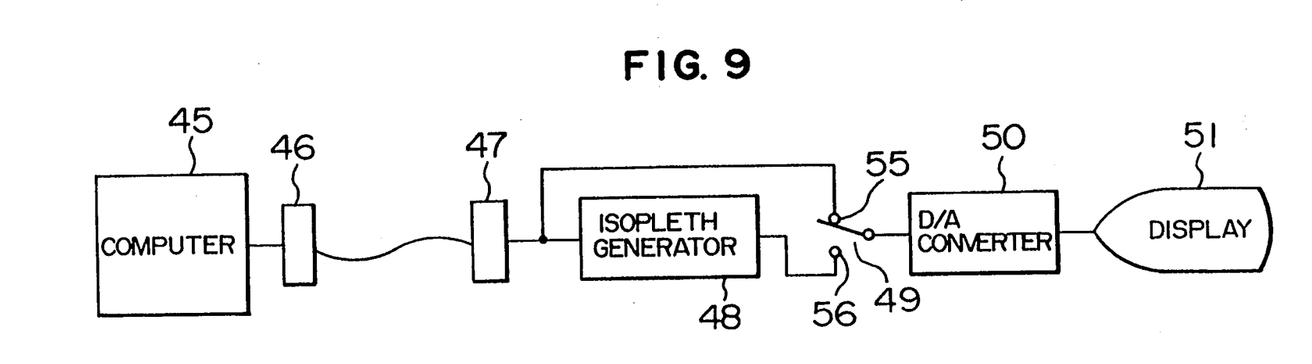
FIGS. 9 and 10 are block diagrams illustrating respective applications of the isopleth generator according to the present invention.

FIG. 9 is a block diagram of an example of application of the present invention.

This embodiment relates to a system in simulation is made by means of a computer and the result is displayed.

In FIG. 9, a reference numeral 45 represents a computer as a data processor, and 46 and 47 represent interfaces connected to each other, for example, through a communication network. A reference numeral 48 represents an isopleth generator, 49 represents a switch, 50 represents a digital-to-analog (D/A) converter, and 51 represents a display as a display device, for example, constituted by a CRT, an LCD, or the like.

Next the operation of the system in FIG. 9 will be described.

For example, simulation of thermal propagation of a structure is performed by the computer 45, and image data expressing the aspect with gradation is outputted through the interface 46.

The above-mentioned output is received by the interface 47, and supplied to the isopleth generator 48 and an input of the switch 49.

The other input of the switch 49 is connected to the output of the isopleth generator 48.

After execution of simulation by means of the computer, if it is desired to observe the result only by the expression with gradation, the active input of the switch 49 is connected to a terminal 55 side, and if it is desired to add isopleths, the active input of the same is connected to another terminal 56 side.

After addition of isopleths after observation only by the expression with gradation, if it is desired to observe the result again, it will do to repeat only a command to output data without applying no particular load to the computer 45.

In addition, in comparison with the case of addition of isopleths by use of a software technique, it is possible to add isopleths so immediately that it is possible to save a memory of a computer, to shorten the time required for calculation, and to reduce the time taken for reading/writing.

Figure 10:
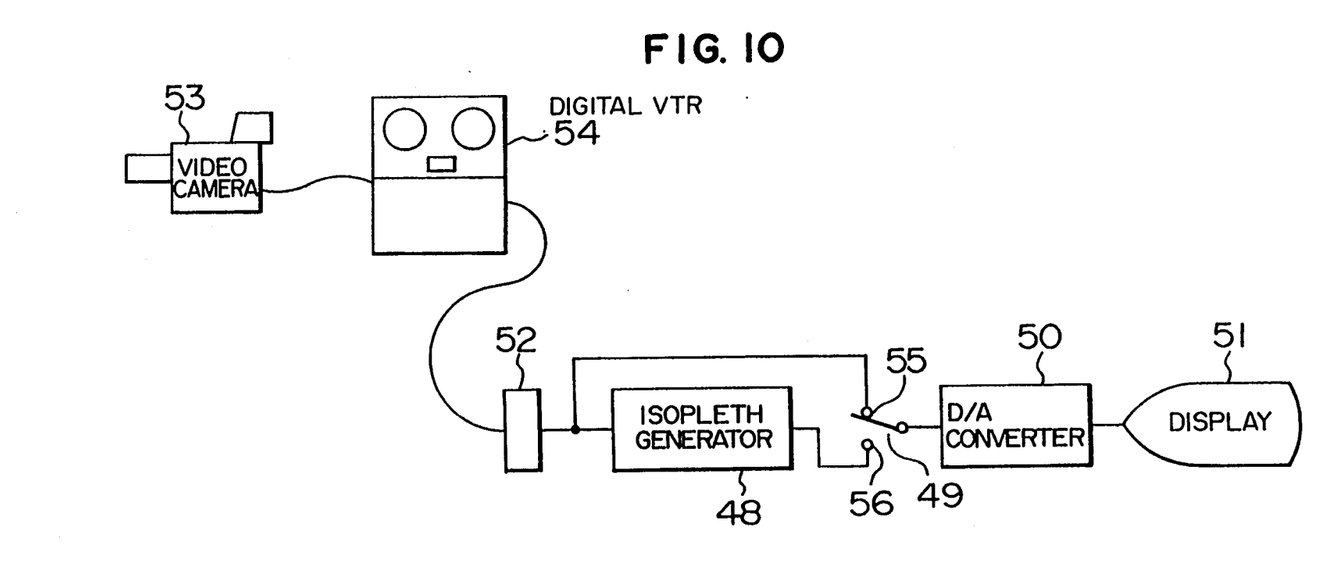

FIG. 10 shows another example of application of the present invention.

This embodiment relates to a system for displaying an image picked up by a video camera according to the present invention.

A reference numeral 53 represents a sensor which may be an infrared-ray video camera in this embodiment. A reference numeral 54 represents a digital VTR, and 52 represents an interface. The video camera 53 and the digital VTR 54 constitutes a data processor.

A reference numeral 48 represents an isopleth generator, 49 represents a switch, 50 represents a digital-to-analog (D/A) converter, and 51 represents a display as a display device.

Next, the operation of the system in FIG. 10 will be described.

An experiment such as thermal propagation of a structure is recorded in the digital VTR 54 through the infrared-ray video camera 53.

In the case of observing the experiment result, it will do that the digital VTR 54 is played back, and whether isopleths are to be added or not is selected by the switch 49.

In the above-mentioned embodiment, by only once experiment, it is possible to observe data to which isopleths are not added, to observe data to which isopleths are added, and to repeat the both.

Upper bits of image data to be compared by the comparators 5 and 11 of FIG. 1 may be made variable so that it is possible to change the density of isopleths into that makes inspection easy at any time after image data has been obtained.

Figure 11:
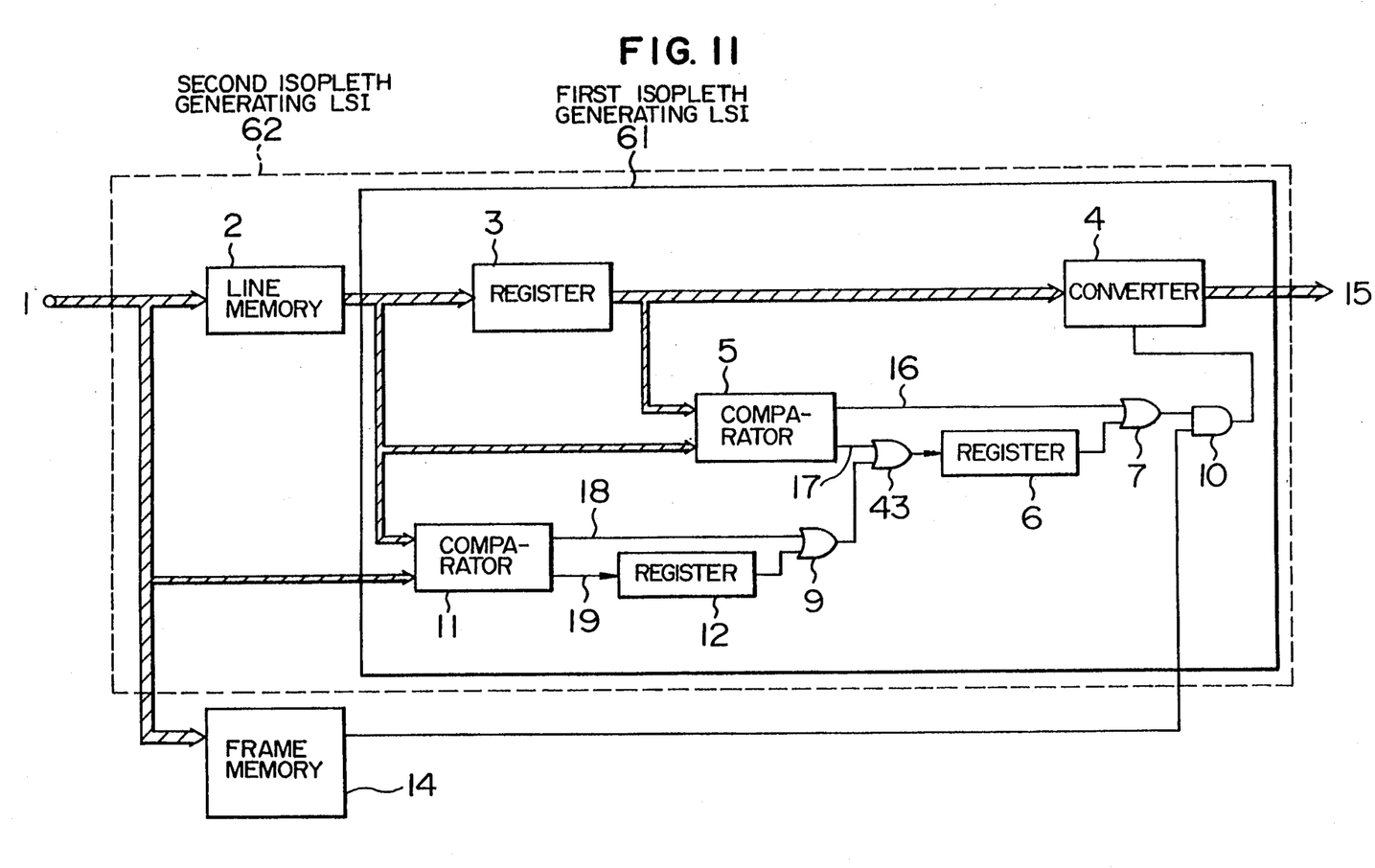
FIG. 11 is a block diagram illustrating first and second isopleth generating LSIs in which the isopleth generator according to the present invention is provided in the form of LSIs. Like reference numerals indicate like portions and components.

FIG. 11 shows a block diagram of an example in which the present invention is applied to an LSI for generating isopleths.

This embodiment is intended to miniaturize an isopleth generator by providing the second embodiment in the form of an LSI.

To produce the isopleth generator in the form of an LSI, there are two types.

One type is a first isopleth generating LSI 61 in which portions other than a line memory 2 requiring a large memory capacity are provided in the form of an LSI. The first isopleth generating LSI 61 includes a comparator 5 as a row comparator, a comparator 18 as a column comparator, registers 3 and 6 for delaying by one sampling period, a register 12 for delaying by one horizontal scanning period, OR gates 9, 43 and 7 for executing ORing between conversion request signals of image data, an AND gate 10 for executing ANDing between a conversion request signal of image data and mask data from a mask frame memory 14, and a converter 4.

The other type is a second isopleth generating LSI 62, in which a line memory 2 for delaying by one horizontal scanning period is integrated with the first isopleth generating LSI 61.

What is claimed is:

1. An isopleth generator for providing isopleths in response to a plurality of numerical data represented by a gradation having a plurality of stages arrayed on rows and columns of two-dimensional directions, comprising:
    input means for receiving numerical data represented by a gradation;
    row comparator means for comparing the magnitude of first gradation numerical data to be displayed with the magnitude of second gradation numerical data located at coordinates adjacent to a row train of the first gradation numerical data, and generating information in response to an instruction for converting said first gradation numerical data into isopleth digital data based on a result of the row comparison;
    column comparator means for comparing the magnitude of third gradation numerical data to be displayed with the magnitude of fourth gradation numerical data located at coordinates adjacent to a column train of the third gradation numerical data, and generating information in response to an instruction for converting the third gradation numerical data into isopleth digital data based on a result of the column comparison; and
    isopleth data generator means for converting one of the first and third gradation numerical data into isopleth digital data and outputting the isopleth digital data in response to the information representing an instruction from one of the row and column comparator means.

2. An isopleth generator for providing isopleths in response to a plurality of numerical data represented by a gradation having a plurality of stages on an image displayed on a display screen with respect to a series of image data having addresses of pairs of numerical values (I,J) on a matrix, said isopleth generator comprising:
    input means for sequentially receiving numerical data represented by a gradation;
    row comparator means for comparing the magnitude of said gradation numerical data with the magnitude of adjacent gradation numerical data in a row train, and generating information indicating whether said gradation numerical data is to be replaced by isopleth digital data for the row train;
    column comparator means for comparing the magnitude of said gradation numerical data with the magnitude of adjacent numerical gradation data in a column train, and generating information indicating whether said gradation numerical data is to be replaced by isopleth digital data for the column train; and
    isopleth data generator means, actuated by output information from at least one of said row comparator means and said column comparator means, for converting said gradation numerical data indicated by the comparison corresponding to said output information into predetermined isopleth digital data and outputting gradation numerical data located at the address of (I,J);
    wherein said row comparator means compares the magnitude of gradation numerical data having the address of (I, J) with the magnitude of gradation numerical data having the address of (I, J+1), said column comparator means compares the magnitude of gradation numerical data having the address (I, J) with the magnitude of gradation numerical data having the address of (I+1, J), and each of said row comparator means and said column comparator means generates output information instructing that the gradation numerical data having an address corresponding to the output information is to be converted into isopleth digital data when two gradation numerical data inputted to each of said comparators are different.

3. An isopleth generator comprising:
    input means for receiving gradation numerical data to be displayed on an image screen;
    first comparator means for comparing, sample by sample, the magnitude of first gradation numerical data with the magnitude of second gradation numerical data having a time difference of one horizontal scanning period from said first gradation numerical data to thereby generate information indicating the gradation numerical data to be converted into isopleth digital data;

second comparator means for comparing the magnitude of said first gradation numerical data with the magnitude of third gradation numerical data having a time difference of one sampling period from said first gradation numerical data to thereby generate information indicating the gradation numerical data to be converted into isopleth digital data; and isopleth data generator means for replacing said gradation numerical data indicated by an output of one of said first and second comparator means with predetermined isopleth digital data and outputting said predetermined isopleth digital data.

4. An isopleth generator according to claim 3, in which each of said first and second comparator means includes means for comparing the magnitude of gradation numerical data with the magnitude of adjacent gradation numerical data on said image screen with respect to one or more bits from most significant bits of each of said gradation numerical data and adjacent gradation numerical data.

5. An isopleth generating method for replacing gradation numerical data having a predetermined address by isopleth digital data represented by gradation having a plurality of stages arranged on rows and columns of two-dimensional directions, comprising the steps of:

comparing the magnitude of gradation numerical data with the magnitude of adjacent gradation numerical data in a row train of said two-dimensional directions to thereby provide a position of each of said gradation numerical data forming an isopleth and replacing specific gradation numerical data having an address corresponding to said position indicated by isopleth digital data; and comparing the magnitude of gradation numerical data with the magnitude of adjacent gradation numerical data in a column train of said two-dimensional directions to thereby provide a position of each of said gradation numerical data forming an isopleth and replacing specific gradation numerical data having an address corresponding to said position indicated by isopleth digital data.

6. An isopleth generator comprising:

input means for sequentially receiving gradation numerical data to be displayed on an image screen;

horizontal delay means for delaying said gradation numerical data by one horizontal scanning period;

first comparator means for comparing the magnitude of said gradation numerical data with the magnitude of said gradation numerical data delayed by one horizontal scanning period to thereby generate information indicating gradation numerical data to be converted into isopleth digital data;

sample delay means for delaying the gradation numerical data outputted from said horizontal delay means by one sampling period;

second comparator means for comparing the magnitude of the gradation numerical data outputted from said horizontal delay means with the magnitude of gradation numerical data outputted from said sample delay means to thereby generate information indicating gradation numerical data to be converted into isopleth digital data; and an isopleth data generator means for replacing said gradation numerical data indicated by an output of one of said first and second comparator means with predetermined isopleth digital data and outputting said predetermined isopleth digital data.

7. A display system in combination comprising:

an isopleth generator for determining isopleths from gradation numerical data including an input means for sequentially receiving gradation numerical data to be displayed on an image screen;

horizontal delay means of delaying said gradation numerical data by one horizontal scanning period;

first comparator means for comparing the magnitude of said gradation numerical data with the magnitude of gradation numerical data delayed by one horizontal scanning period to thereby generate information indicating gradation numerical data to be converted into isopleth digital data;

sample delay means for delaying the gradation numerical data outputted from said horizontal delay means by one sampling period;

second comparator means for comparing the magnitude of the gradation numerical data outputted from said horizontal delay means with the the magnitude of the gradation numerical data outputted from said sample delay means to thereby generate information indicating gradation numerical data to be converted into isopleth digital data;

isopleth data generator means actuated by an output of one of said first and second comparator means, for converting the gradation numerical data into predetermined isopleth digital data and outputting said predetermined isopleth digital data;

data providing means for supplying gradation numerical data to said isopleth generator; and a display device for displaying an image on an image display screen based on the gradation numerical data generated from said isopleth generator.

* * * * *